Figure 1A:
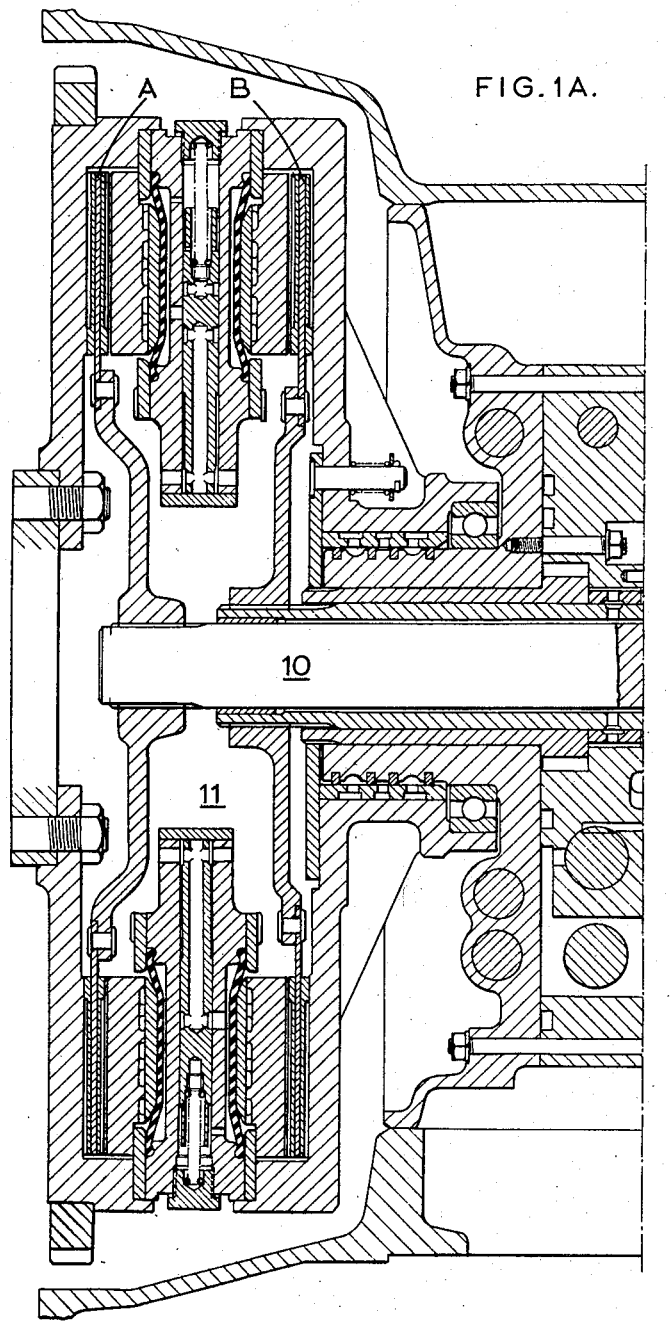
Figure 1B:
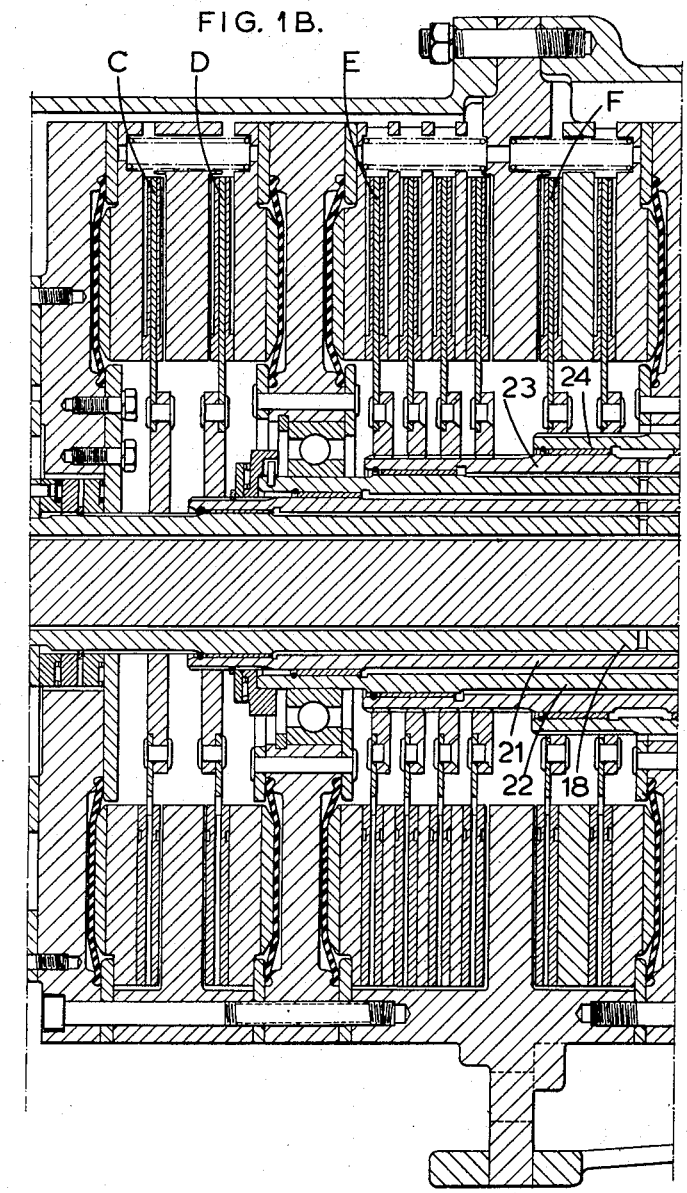

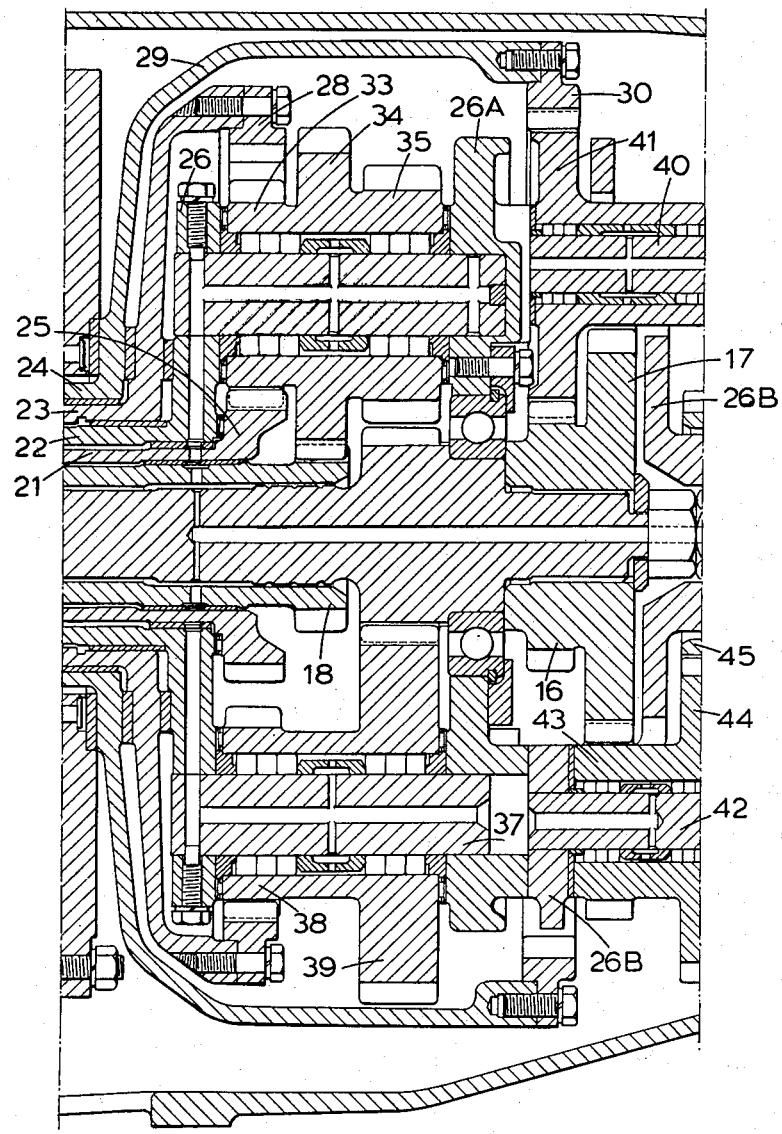
FIG. IC.

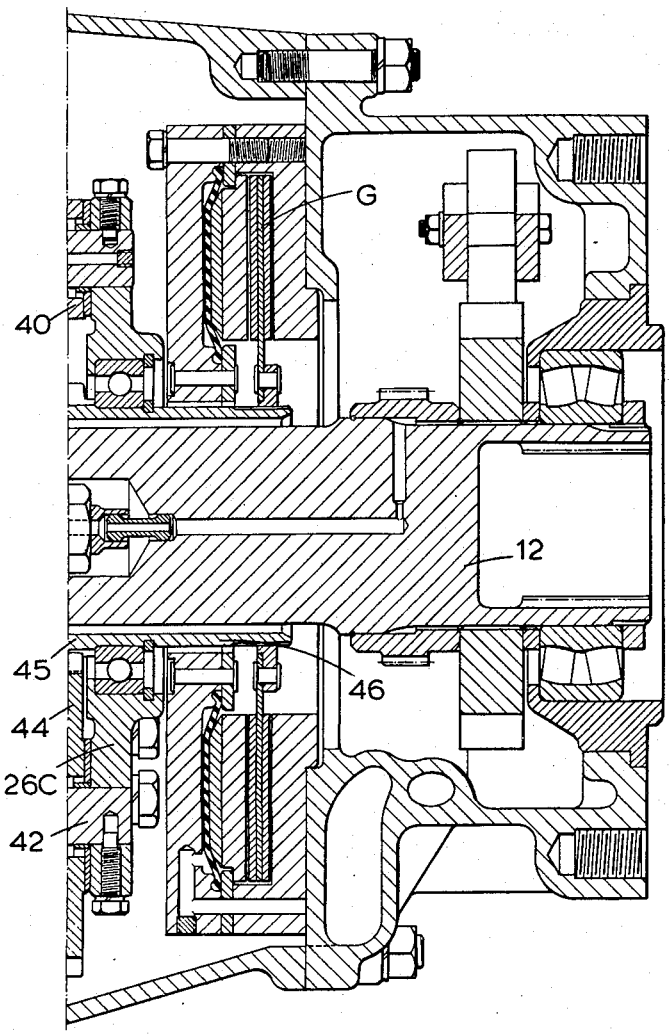

3,115,793
POWER TRANSMISSION APPARATUS
Howard Frederick Hobbs, Leamington Spa, England, assignor to Hobbs Transmission Limited, Leamington Spa, England
Filed Feb. 5, 1962, Ser. No. 170,957
Claims priority, application Great Britain Feb. 9, 1961
4 Claims. (Cl. 74—761)

This invention relates to power transmission apparatus of the kind having two input clutches which can be engaged independently and simultaneously, an epicyclic change-speed gearing driving an output shaft, and reaction brakes which can be engaged for holding required parts of the epicyclic gearing for obtaining required for obtaining required ratios. A particular example of such apparatus is described in the specification of our Patent No. 738,590.

The object of the present invention is to facilitate obtaining four or more forward ratios including an overdrive ratio while maintaining a combination of other desirable characteristics, viz. obtaining all forward ratios with the engagement of the same input clutch, the other clutch being additionally engaged in one forward ratio whereby change to each forward ratio is effected without releasing one clutch and engaging the other; the same brake is used for first forward ratio and for reverse ratio whereby the two ratios involving greatest torque can be handled by the same large capacity brake; progressive change of speed and momentum of the parts of the epicyclic gearing as the changes are made progressively through the ratios; and able to provide the range and steps in ratio required for road and other motor vehicles.

According to the invention the mechanism comprises first and second input clutches engageable separately and simultaneously, the first of which is engaged in all forward ratios, said clutches driving inner and outer coaxial input shafts; epicyclic gearing including first and second sunwheels carried by the inner input shaft and a sunwheel carried by the outer clutch shaft and a cage fixed to an output shaft and reaction brakes connected with the gearing; said gearing including means drivably connecting the first sunwheel to one of said reaction brakes to produce an underdrive ratio and means drivably connecting the second sunwheel with another reaction brake to provide an overdrive ratio.

The overdrive planetary pinion may be geared to the overdrive brake by means of a double pinion offset from the axis of the gearing and having its smaller pinion wheel meshing with the overdrive sunwheel and its larger pinion wheel meshing with an overdrive brake sunwheel coaxial with the overdrive sunwheel.

The overdrive brake may be disposed coaxially with the axis of the apparatus at the output end of the gearing whilst the other brakes may be disposed between the clutches and the gearing.

A constructional form of the invention will now be described by way of example with reference to the accompanying drawing which is a sectional view of an apparatus made in accordance with the invention having six forward ratios and reverse ratio.

The apparatus comprises first and second input or driving clutches A, B, the clutch discs of which are mounted respectively on a shaft 10 and a sleeve 11 that surrounds the shaft 10. Four brakes C, D, E, F, surround the sleeve 11 and are disposed along the axis of the apparatus between the clutches A, B, and an epicyclic gearing indicated generally by H. The gearing drives an output shaft 12 which supports, at the output end of the gearing H, an overdrive brake G.

The shaft 10 carries first, second and third sunwheels 15, 17, 16, of which 16, 17 are formed separately and keyed to the shaft 10. The sleeve 11 carries the brake C and a sunwheel 18. 16 is referred to as the third sunwheel as this is not essential to the invention.

Surrounding the sleeve 11 are further sleeves 21, 22, 23, 24. Sleeve 21 carries the brake D at one end and a sunwheel 25 at the other end. The output end of the sleeve 22 carries the cage 26 of the gearing H. This cage is formed with or carries parts 26A, 26B, 26C, which latter is fixed to the output shaft 12.

The sleeve 23 carries the brake E at one end and a ring gear 28 at the other end. Sleeve 24 carries the brake F and a housing 29 which in turn carries a ring gear 30. The cage 26 carries two pairs of planetary spindles, two of which carry a triple pinion 33, 34, 35, and a spindle 37 carrying a double pinion comprising pinions 38, 39. Pinion 33 meshes with sunwheel 25; pinion 34 with sunwheel 18; pinion 35 meshes with pinion 39; and underdrive ratio reaction pinion 39 with sunwheel 15. The ring gear 28 meshes with pinion 38.

The cage H carries two further pairs of planetary spindles and pinions of which only one of each is shown, viz. spindle 40 carrying pinion 41 meshing with ring gear 30 and spindle 42 carrying a double pinion comprising a small reaction pinion 43 meshing with sunwheel 17 and a larger overdrive reaction pinion 44 meshing with an overdrive reaction sunwheel 45 on a sleeve 46 coaxial with the gearing axis and carrying the overdrive reaction brake G.

The brakes and brake sleeves and cage are all coaxial with the input shafts 10, 11, and the spindles 32, 37, 40, 42, are all offset from the axis of the input shafts.

In the axial direction of the gear it will be seen that the reaction brakes C, D, E, F, for underdrive ratios are located between the clutches A, B, and the epicyclic gearing; the epicyclic gearing is located between the underdrive brakes on the input side and the overdrive brake G on the output side; the spindles 32, 37, are in the same axial position as each other; and the spindles 40, 42, are in the same position as each other but offset from the spindles 32, 37.

When clutch A and brake G are engaged the pinions 43, 44, cause the cage 26 (and with it the output shaft) to run at overdrive speeds.

The ratios are obtained by engaging the clutches and brakes as follows:

First ratio clutch A and brake E engaged.
Second ratio clutch A and brake F engaged.
Third ratio clutch A and brake D engaged.
Fourth ratio clutch A and brake C engaged.
Fifth ratio both clutches A and B engaged.
Sixth (overdrive) clutch A and brake G engaged.
Reverse ratio clutch B and brake E engaged.

If only five forward speeds (including overdrive) are required the gears 41, 30, and brake F may be omitted.

If only four forward speeds (including overdrive) are required the gears 28, 38, can be omitted.

The engagement of the clutches and brakes may be effected as described in the specifications of our prior British Patents Nos. 628,499, 628,523, 637,251, 643,499, 673,737, 738,588, 777,871, 784,724 and 803,874.

I claim:

1. A power transmission mechanism comprising a housing, first and second input clutches, first and second input shafts connected respectively with said clutches, the first input shaft being located coaxially within the second input shaft; first and second sunwheels carried by the first input shaft; an output shaft, a rotary cage connected to the output shaft, at least three pinion members carried by the rotary cage on an axis offset from the axis of the rotary cage, these pinion members including a triple pinion member, an underdrive ratio pinion member and an overdrive ratio double pinion member; a first reaction sunwheel meshing with the first pinion of the triple pinion, another sunwheel on the second input shaft meshing with the second pinion of the triple pinion member; said first sunwheel meshing with a pinion of the underdrive ratio pinion member, which latter mentioned pinion also meshes with the third pinion of the triple pinion member; said second sunwheel meshing with the first pinion of the overdrive double pinion member; a second reaction sunwheel meshing with the second pinion of the overdrive double pinion member, an underdrive reaction brake carried by the housing and acting on to the first reaction sunwheel; and an overdrive reaction brake carried by the housing and acting on the second reaction sunwheel.

2. A power transmission mechanism as claimed in claim 1 wherein the cage is disposed between the clutches and reaction brakes on the input side and the overdrive brake on the output side, the spindle carrying the overdrive double pinion member being also located on the output side.

3. A power transmission mechanism as claimed in claim 1 having a spindle carried by the cage, a pinion on said spindle, a third sunwheel on the first input shaft meshing with said spindle, a ring gear meshing with said last mentioned pinion, and a further underdrive reaction brake carried by the housing and acting on said second ring gear.

4. A power transmission mechanism as claimed in claim 1 having a second underdrive pinion connected to the aforesaid underdrive pinion member, a ring gear meshing with said second underdrive pinion, and a further reaction brake carried by the housing and acting on said ring gear.

References Cited in the file of this patent

UNITED STATES PATENTS 2,803,974    Kelley _____ Aug. 27, 1957

FOREIGN PATENTS 384,880    France _____ Apr. 24, 1908
586,165    Canada _____ Nov. 3, 1959
789,430    Great Britain _____ Oct. 11, 1961